US012496363B2

(12) United States Patent
Cheon et al.

(10) Patent No.: US 12,496,363 B2
(45) Date of Patent: Dec. 16, 2025

(54) METHOD FOR INCREASING DISPERSION STABILITY OF NANOPARTICLES AS T1 MRI CONTRAST AGENT AND T1 MRI CONTRAST NANOPARTICLES

(71) Applicant: Inventera Inc., Seoul (KR)

(72) Inventors: Jin Woo Cheon, Seoul (KR); Tae Hyun Shin, Seoul (KR)

(73) Assignee: INVENTERA INC., Seoul (KR)

( * ) Notice: Subject to any disclaimer, the term of this patent is extended or adjusted under 35 U.S.C. 154(b) by 898 days.

(21) Appl. No.: 15/999,746

(22) PCT Filed: Feb. 20, 2017

(86) PCT No.: PCT/KR2017/001852
§ 371 (c)(1),
(2) Date: Nov. 27, 2018

(87) PCT Pub. No.: WO2017/142382
PCT Pub. Date: Aug. 24, 2017

(65) Prior Publication Data
US 2019/0083660 A1   Mar. 21, 2019

(30) Foreign Application Priority Data
Feb. 18, 2016 (KR) .................. 10-2016-0019363

(51) Int. Cl.
*A61K 49/18* (2006.01)
(52) U.S. Cl.
CPC ...... *A61K 49/1863* (2013.01); *A61K 49/1878* (2013.01); *A61K 2123/00* (2013.01)
(58) Field of Classification Search
None
See application file for complete search history.

(56) References Cited

U.S. PATENT DOCUMENTS

| 9,040,637 | B2 | 5/2015 | Axelsson et al. | |
|---|---|---|---|---|
| 2005/0265922 | A1* | 12/2005 | Nie | A61K 49/0067 435/7.1 |
| 2009/0110644 | A1* | 4/2009 | Margel | A61K 47/6921 424/9.322 |
| 2010/0111859 | A1 | 5/2010 | Axelsson et al. | |
| 2010/0183504 | A1 | 7/2010 | Chen | |
| 2011/0014296 | A1 | 1/2011 | Chen et al. | |
| 2011/0200534 | A1 | 8/2011 | Cheon et al. | |
| 2012/0134932 | A1 | 5/2012 | Stoll et al. | |
| 2013/0195767 | A1 | 8/2013 | Weissleder et al. | |
| 2014/0350193 | A1 | 11/2014 | Axelsson et al. | |
| 2016/0000942 | A1* | 1/2016 | Cheon | A61K 49/14 424/9.32 |
| 2018/0361000 | A1* | 12/2018 | Weissleder | A61K 51/065 |
| 2021/0113717 | A1 | 4/2021 | Cheon et al. | |

FOREIGN PATENT DOCUMENTS

| CN | 102631689 | 8/2012 | | |
|---|---|---|---|---|
| CN | 103484099 | 1/2014 | | |
| CN | 112089851 | 12/2020 | | |
| CN | 112807449 | 5/2021 | | |
| EP | 2942064 A1 | 11/2015 | | |
| JP | 2002-517085 | 6/2002 | | |
| JP | 2014-534277 A | 12/2014 | | |
| KR | 10-2007-0058358 A | 6/2007 | | |
| KR | 10-2008-0071463 A | 8/2008 | | |
| KR | 1020090033953 | 4/2009 | | |
| KR | 1020100023778 | 3/2010 | | |
| KR | 1020110050213 | 5/2011 | | |
| KR | 2012-0084466 | 7/2012 | | |
| KR | 10-2015-0115760 A | 10/2015 | | |
| WO | WO 1989/011874 | 12/1989 | | |
| WO | WO-9962079 A1 * | 12/1999 | .......... | H01F 1/0054 |
| WO | WO 2009/040811 | 4/2009 | | |
| WO | WO 2010048268 | 4/2010 | | |
| WO | WO 2011/006002 | 1/2011 | | |
| WO | WO 2012/020911 | 2/2012 | | |
| WO | WO-2014107055 A1 * | 7/2014 | ............. | A61K 49/06 |

OTHER PUBLICATIONS

Alric, C., et al., "Gadolinium Chelate Coated Gold Nanoparticles as Contrast Agents for Both X-ray Computed Tomography and Magnetic Resonance Imaging", JACS, pp. 5908-5915 (Year: 2008).*
Ren, B., et al., "Assembly Behavior of Iron Oxide-Capped Janus Particles in a Magnetic Field", Langmuir, pp. 1149-1156 (Year: 2011).*
Sirlin, C.B., et al., "Gadolinium-DTPA-dextran: A macromolecular MR blood pool contrast agent", Academic Radiology, pp. 1361-1369 (Year: 2004).*
Lee, C.N., et al., "Super-paramagnetic iron oxide nanoparticles for use in extrapulmonary tuberculosis diagnosis", Clinical Microbiology and Infection, pp. E149-E157 (Year: 2012).*
Ersory, H., et al., "Biochemical Safety Profiles of Gadolinium-Based Extracellular Contrast Agents and Nephrogenic Systemic Fibrosis", J Magn Reson Imaging, pp. 1-16 (Year: 2007).*
Sauzedde, F., et al., "Hydrophilic magnetic polymer latexes.1. Adsorption of magnetic iron oxide nanoparticles onto various cationic latexes", Colloid Polym Sci., pp. 846-855 (Year: 1999).*
Extended European Search Report from corresponding European Patent Application No. 17753543.2, dated Oct. 7, 2019.
Office Action from corresponding Japanese Patent Application No. 2018-543635, dated Aug. 26, 2019.
Gole, A., et al.; "Iron Oxide Coated Gold Nanorods: Synthesis, Characterization, and Magnetic Manipulation", Langmuir 2008, 24, pp. 6232-6237.
Bridot, J., et al.; "Hybrid Gadolinium Oxide Nanoparticles: Multimodal Contrast Agents for in Vivo Imaging", J. Am. Chem. Soc. 2007, 129, pp. 5076-5084.

(Continued)

*Primary Examiner* — Jennifer Chin
(74) *Attorney, Agent, or Firm* — Sughrue Mion, PLLC (57) ABSTRACT

The present invention improves an existing contrast agent, especially, a T1 contrast agent, and adopts a strategy in which the T1 contrast material is partially coated on a support surface to which a hydrophilic functional group is exposed. The partial coating strategy adopted in the present invention improves both the stability and contrast performance of T1 contrast agent nanoparticles, and such a strategy leads to very interesting technical development.

12 Claims, 5 Drawing Sheets

(56) References Cited

OTHER PUBLICATIONS

Shevchenko, E. V., et al.; "Gold/Iron Oxide Core/Hollow-Shell Nanoparticles", Adv. Mater. 2008, 20, pp. 4323-4329.
Na, H. B., et al.; "Development of a $T_1$ Contrast Agent for Magnetic Resonance Imaging Using MnO Nanoparticles", Angew. Chem. Int. Ed. 2007, 46, pp. 5397-5401.
Lee, J. H., et al.; "Artificially engineered magnetic nanoparticles for ultra-sensitive molecular imaging", Nature Medicine. vol. 13, No. 1, Jan. 2007, pp. 95-99.
Yang, H., et al.; "Targeted dual-contrast $T_1$- and $T_2$-weighted magnetic resonance imaging of tumors using multifunctional gadolinium-labeled superparamagnetic iron oxide nanoparticles", Biomaterials 32 (2011) 4584-4593.
Cheon, J., et al. (2007) "Artificially engineered magnetic nanoparticles for ultra-sensitive molecular imaging." *Nature Medicine*, 13(1):95-99.
Hyeon, T. et al. (2007) *"Development of a 1 Contrast Agent for Magnetic Resonance Imaging Using MnO Nanoparticles."*, *Angew. Chem. Int. Ed.*, 46:5397-5401.
Riviere, C., et al. (2007) "Hybrid Gadolinium Oxide Nanoparticles: Multimodal Contrast Agents for in Vivo Imaging." *J. Am. Chem. Soc.*, 129, pp. 5076-5084.
H.P Erickson et al., "Size and Shape of Protein Molecules at the Nanometer Level Determined by Sedimentation, Gel Filtration, and Electron Microscopy," Biol. Proceed. Online, 2009, 11:32-51.
International Preliminary Report on Patentability in Appln. No. PCT/KR2014/000062, dated Jul. 7, 2015, 10 pages.
International Preliminary Report on Patentability in Appln. No. PCT/KR2017/001852, dated Aug. 21, 2018, 11 pages.
International Search Report (ISR) from corresponding PCT Application No. PCT/KR2017/001852, dated Jun. 13, 2017 and its English translation.
International Search Report and Written Opinion in Appln. No. PCT/KR2014/000062, mailed Apr. 30, 2014, 9 pages.
Ryu et al., "Synthesis and Electrochemical Characterization of Silica-Manganese Oxide with a Core-shell Structure and Various Oxidation States," Bulletin of the Korean Chemical Society, 2011, vol. 32, No. 8. pp. 2683-2688.
Office Action from Chinese Application No. 202011048294.7, dated May 9, 2022, 13 pages (with Machine translation).
Liu et al., "Synthesis and characterization of SiO2/Gd2O3:Eu core-shell luminescent materials," Journal of Colloid and Interface Science, Oct. 1, 2004, 278(1):133-138.
Petoral et al., "Synthesis and characterization of Tb3+-doped Gd2O3 nanocrystals: a bifunctional material with combined fluorescent labeling and MRI contrast agent properties," The Journal of Physical Chemistry, 2009, 113(17):6913-6920.
Ryu et al., "Synthesis and electrochemical characterization of silica-manganese oxide with a core-shell structure and various oxidation states," Bulletin of the Korean Chemical Society, 2011, 32(8):2683-2688.
Schladt et al., "Multifunctional superparamagnetic MnO@ SiO 2 core/shell nanoparticles and their application for optical and magnetic resonance imaging," Journal of Materials Chemistry, 2012, 22(18):9253-9262.
Small et al., "Dual contrast enhancement of both T1-and T2-weighted sequences using ultrasmall superparamagnetic iron oxide," Magnetic Resonance Imaging, 1993, 11(5):645-654.
Steckel et al., "Monolayer and Multilayer Films of [Mn12o12 (o2CMe) 16]," Nano Letters, 2004, 4(3):399-402.

* cited by examiner

FIG. 5

METHOD FOR INCREASING DISPERSION STABILITY OF NANOPARTICLES AS T1 MRI CONTRAST AGENT AND T1 MRI CONTRAST NANOPARTICLES

CROSS-REFERENCE TO RELATED APPLICATIONS

This application is a national phase application of PCT Application No. PCT/KR2017/001852, filed on 20 Feb. 2017, which claims priority to Korean Patent Application No. 10-2016-0019363 filed on 18 Feb. 2016. The entire disclosures of the applications identified in this paragraph are incorporated herein by reference.

FIELD

The present invention relates to a method for increasing the dispersion stability of nanoparticles as T1 MRI contrast agents and to T1 MRI contrast agent nanoparticles.

BACKGROUND

Nanomaterials exhibit new physical/chemical properties different from those of bulk materials due to reduced sizes thereof. A lot of research on nanomaterials makes it possible to control not only the size but also the composition or shape of the materials, thereby implementing excellent physical/chemical characteristics in nano-regions. Current nanotechnologies have been variously developed, and widely classified into three fields: (i) Technology for synthesizing novel ultra-micro-sized substances and materials using nanomaterials; (ii) Technology for manufacturing devices exerting predetermined functions by combining or arranging nano-sized materials in nano-devices; and iii) Technology in which nanotechnology is grafted into biotechnology (nano-bio).

Of many various nanoparticles, magnetic nanoparticles can be extensively used in nano-bio technology, such as bio-molecule separation, magnetic resonance imaging (MRI) diagnosis, a magnetic bio-sensor including a giant magnetoresistance sensor, a micro-fluid system, a drug/gene delivery system, and magnetic hyperthermia therapy. In particular, magnetic nanoparticles can be used as diagnostic agents for magnetic resonance imaging (MRI). MRI is used to measure nuclear spin relaxation of hydrogen atoms in water molecules, providing TI and T2 images. MRI contrast agents are classified into TI contrast agents and T2 contrast agents, which serve to amplify TI or T2 signals. TI and T2 refer to the spin-lattice relaxation time and the spin-spin relaxation time after nuclear spins are excited in MRA, respectively, and produce different contrast effects.

TI contrast agents are composed of paramagnetic materials capable of inducing spin-lattice relaxation. In general, the presence of T1 contrast agents can produce bright or positive contrast effects compared with water. Gd-chelate compounds may be mainly used as TI contrast agents, and the Magnevist (Schering, Germany) used to obtain MR images contains Gd-diethylene triamine pentaacetic acid (Gd-DTPA). In addition, it has been reported that several materials, such as $Gd_2O_3$ (C. Riviere et al. J. Am. Chem. Soc. 2007, 129, 5076) and MnO (T. Hyeon et al. Angew. Chem. Int. Ed. 2007, 46, 5397), are used as TI contrast agents.

On the contrary, superparamagnetic nanoparticles, such as iron oxide nanoparticles, have been mainly used as T2 contrast agents. These magnetic nanoparticles are magnetized by the application of an external magnetic field, thus generating an induction magnetic field, which influences a spin-spin relaxation process of hydrogen nuclear spins of nearby water molecules, thereby amplifying MRI signals, resulting in a dark or negative contrast effect compared with water. T2 contrast agents that have been mainly used include Feridex, Resovist, and Combidex each containing iron oxide components. Recently, magnetism engineered iron oxide (MEIO) having an enhanced contrast effect through the substitution of some of iron oxide components has been developed (J. Cheon et al. Nature Medicine 2007, 13, 95).

In MRI, TI signals have high signal intensity (bright signals), providing excellent resolution between tissues, thereby discriminating anatomical structures more clearly. In addition, TI images may characteristically show high signal intensity in sub-acute bleeding (4-14 days after bleeding), and thus T1 images are useful in determining the presence or absence of bleeding in a lesion.

Currently, metal chelate-based materials that are generally used as T1 contrast agents fail to effectively relax the hydrogen nuclear spin in water molecules due to a fast molecule movement (tumbling rate) due to a small size thereof. Meanwhile, metal oxide-based nanoparticles have a slow molecule movement compared with the metal chelate nanoparticles, and allow cooperative nuclear spin relaxation by several metals, but the effect thereof is restricted due to a low surface area-volume ratio. Therefore, the development of T1 MRI contrast agent nanoparticles which have a more efficient contrast effect by overcoming the restriction of the existing T1 contrast agents is required.

In order to overcome the above described problems of conventional T1 agents, the present inventors have developed a novel T1 MRI contrast gene (WO 2014/107055). However, the T1 contrast agent by the present inventors needs to be developed into a more druggable material and especially, the dispersion stability of the T1 contrast agent in a solution needs to be improved.

Throughout the specification, many papers and patent documents are used as references, and the citations thereof are represented. The disclosure of the cited papers and patent documents is incorporated in the present specification by reference in its entirety, to describe a level of the technical field to which the present invention pertains and content of the present invention more clearly.

SUMMARY

Technical Problem

The present inventors have developed a contrast agent having excellent contrast ability by coating a T1 contrast material on a surface of a nanoparticle support (WO 2014/107055). The present inventors endeavored to develop T1 contrast agents, which have an improved performance, are more druggable, and especially, have excellent dispersion stability in a solution. As a result, the present inventors established that, by partially coating a T1 contrast material on a surface of a support, the dispersion stability of nanoparticle contrast agents can be significantly improved and the contrast ability thereof can also be improved.

Therefore, an aspect of the present invention is to provide a method for increasing the dispersion stability of nanoparticles as a contrast agent.

Another aspect of the present invention is to provide contrast agent nanoparticles.

Other purposes and advantages of the present disclosure will become more obvious with the following detailed description of the invention, claims, and drawings.

Technical Solution

In accordance with an aspect of the present invention, there is provided a method for increasing dispersion stability of nanoparticles as T1 contrast agents, the method including:
(a) selecting a support material capable of, when particlized, exposing hydrophilic chemical functional groups on a surface;
(b) using the support material to manufacture support particles, wherein hydrophilic chemical function groups are exposed on a surface of each of the support particles and the hydrodynamic size of the support particles is 1-20 nm; and
(c) coating a T1 contrast material on the support particles to manufacture nanoparticles as constant agents, wherein the coating of the T1 contrast material is achieved by bonding between the contrast material and the hydrophilic functional groups on the surface of the support particle; the coating of the T1 contrast material is a partial coating on the surface of the support; some of the hydrophilic functional groups on the support particle are still exposed on the surface of the support; and the hydrodynamic size of the nanoparticles is 2-30 nm.

The present inventors have developed a contrast agent having excellent contrast ability by coating a T1 contrast material on a surface of a nanoparticle support (WO 2014/107055). The present inventors endeavored to develop T1 contrast agents, which have an improved performance, are more druggable, and especially, have excellent dispersion stability in a solution. As a result, the present inventors established that, by partially coating a T1 contrast material on a surface of a support, the dispersion stability of nanoparticle contrast agents can be significantly improved and the contrast ability thereof can also be improved.

As far as the present inventors know, there is no prior research to improve the dispersion stability and contrast ability of nanoparticle contrast agents by partially coating a T1 contrast material on a surface of a support, and this fact corresponds to one of the most important technical features of the present invention.

The method of the present invention will be described by steps in detail:

Step (a): Selection of Support Material

First, a support material capable of, when particlized, exposing hydrophilic chemical functional groups to a surface is selected.

A support material suitable for the present invention is a material that can accommodate a contrast material and, when particlized, expose hydrophilic chemical functional groups on a surface. Specifically, a support material suitable for the present invention is a material that can have hydrophilic chemical functional groups on a surface thereof by reaction with a cross-linker having hydrophilic functional groups. Alternatively, a support material suitable for the present invention is a material, which itself can expose hydrophilic chemical functional groups without the aid of a cross-linker.

More specifically, the support material used in the present invention is an organic polymer, silica, or gold (Au) each containing hydrophilic chemical functional groups.

As used herein, the term "organic polymer" includes any material, among polymers having an organic molecule as a monomer, which has rigidity and thus can serve as a supporting material for a coating layer of a contrast agent material (especially, a T1 contrast agent material).

The organic polymer containing a hydrophilic chemical functional group, which is used as a support in the present invention, includes specifically polysaccharides, proteins (e.g., albumin, aprotinin, and lysozyme), lipids, or nucleic acids, and more specifically includes polysaccharides.

The polysaccharide used in the present invention include various polysaccharides containing hydrophilic chemical functional groups known in the art, and examples thereof include, but are not limited to, dextran, cellulose, starch, glycogen, chitosan, stachyose, schrodose, xylan, arabane, hexosan, proctane, galactan, mannan, agaropectin, alginic acid, carrageenan, hemicellulose, hypromellose, chitin, agarose, dextrin, carboxymethylcellulose, glycogen dextran, carbodextran, cyclodextran, pullulan, or derivatives thereof. More specifically, the polysaccharide used in the present invention is dextrin.

Step (b): Manufacturing of Support Particles

Then, support particles are manufactured by using the support material. Hydrophilic chemical function groups are exposed on a surface of each of the support particles and the hydrodynamic size of the support particles is 1-20 nm.

Step (b) is a step in which nano-supports are prepared by using a support raw material.

The preparation of the nano-supports by using the support raw material may be carried out by various methods for manufacturing nanoparticles, known in the art.

For example, a method for manufacturing silica nano-supports is disclosed in WO2014/107055. Briefly, silica nano-supports can be manufactured by forming reverse micelles using a surfactant (e.g., a non-ionic surfactant, such as poly(oxyethylene)nonyl phenyl ether), adding tetraethoxy silane as a silica precursor, and then carrying out a reaction at room temperature.

A method for manufacturing gold nano-supports is exemplified in an example below. In addition, a method for manufacturing organic polymer nano-supports is exemplified in an example below.

According to an embodiment of the present invention, in step (b), the organic polymer is allowed to react with a cross-linker having hydrophilic chemical functional groups to crosslink the organic polymer.

The cross-linker having hydrophilic chemical functional groups includes not only a cross-linker itself having hydrophilic chemical functional groups before the reaction but also a cross-linker having hydrophilic chemical functional groups formed by a change of the chemical structure after the reaction.

A cross-linker suitable for the present invention includes any cross-linker having hydrophilic chemical functional groups. Examples of the cross-linker suitable for the present invention include, but are not limited to, an epoxide cross-linker, an amine cross-linker, a cross-linker having anhydride groups, a polyisocyanate cross-linker, and a combination thereof.

Examples of the epoxide cross-linker include, but are not limited to, 1-chloro-2,3-epoxypropane (epichlorohydrin), 1,4-cyclohexane dimethanol-diglycidyl ether, 1,4-butanediol diglycidyl ether, bisphenol-F diglycidyl ether, isocyanuric acid tris-(2,3-epoxypropyl) ester, neopentyl glycol diglycidyl ether, triphenylol methane triglycidyl ether, and bisphenol-A diglycidyl ether.

Examples of the amine cross-linker include, but are not limited to, ethylene diamine, 1,3-propane diamine, diethylene triamine, triethylene tetramine, tetraethylene pentamine, aminoethyl piperazine, 4,7,10-trioxa-1,13-tridecane diamine, 2,2'-(ethylenedioxy)diethyl amine, 1,3-bis-(aminomethyl)cyclohexane, 1,3-bis-(4-aminophenoxy)benzene, 4,4'-methylenebis-cyclohexylamine, and 5-amino-1,3,3-trimethylcyclohexane methylamine.

Examples of the cross-linker having anhydride groups include, but are not limited to, 2,2-bis-(4-phthalic anhydride-4-oxyphenyl)-propane, butanetetracarboxylic acid dianhydride, 4,4'-oxybisphthalic acid anhydride, benzophenone-3,3',4,4'-tetracarboxylic acid dianhydride, and biphenyl-3,3',4,4'-tetracarboxylic acid dianhydride.

Examples of the polyisocyanate cross-linker include, but are not limited to, 1,3-bis-(1-isocyanato-1-methylethyl)benzene, 1,3-bis-(isocyanatomethyl)-cyclohexane, hexamethylene diisocyanate, toluene-2,4-diisocyanate, trimethylhexamethylene diisocyanate, methylene di(phenylisocyanate), 4,4'-diisocyanatodicyclohexyl methane, and isophorone diisocyanate.

Specifically, the cross-linker used in the present invention includes an epoxide cross-linker, an amine cross-linker, or a combination thereof, and more specifically, an epoxide cross-linker, a diamine cross-linker, or a combination thereof.

Still more specifically, the cross-linker used in the present invention is a combination of an epoxide cross-linker having two reactive groups and a diamine cross-linker.

When the epoxide cross-linker having two reactive groups is used, both reactive groups may include epoxy groups, or one of the reactive groups may include an epoxy group and the other may include a halogen element.

Still more specifically, the cross-linker used in the present invention is a combination of a diamine cross-linker and an epoxide cross-linker having an epoxy group as one reactive group and a halogen element as the other. In such a case, the epoxide cross-linker is a main cross-linker that crosslinks the support material. The diamine cross-linker interferes in the bonding of the epoxide cross-linker and the support material, thereby increasing the length of cross-linkage. For example, support particles formed by a combination of an epoxide cross-linker and a diamine cross-linker may be a "support material-epoxide cross-linker-diamine cross-linker-support material". Therefore, the diamine cross-linker improves the crosslinking efficiency and allows the cross-linked support material to have preferable properties/characteristics.

In addition, amine groups of the diamine cross-linker serve to improve the coating of a contrast material.

According to a specific embodiment of the present invention, in step (b), an organic polymer (e.g., dextran), an epoxide cross-linker having an epoxy group as one reactive group and a halogen element as the other (e.g., epichlorohydrin), and a diamine cross-linker (e.g., ethylene diamine) are allowed to react at a proper temperature (e.g., room temperature) to obtain support particles that are cross-linked and composed of an organic polymer.

The hydrodynamic size of the manufactured nano-supports is 1-20 nm; specifically 1-15 nm, 1-10 nm, 1-8 nm, 1-5 nm, 1-4 nm, 2-15 nm, 2-10 nm, 2-8 nm, 2-5 nm, 2-4 nm, 3-15 nm, 3-10 nm, 3-8 nm, 3-5 nm, 3-4 nm, 4-15 nm, 4-10 nm, 4-8 nm, 4-7 nm, or 4-5 nm; more specifically, 3-15 nm, 3-10 nm, 3-8 nm, 3-5 nm, 3-4 nm, 4-15 nm, 4-10 nm, 4-8 nm, 4-7 nm, or 4-5 nm; still more specifically, 3-10 nm, 3-8 nm, 3-5 nm, 3-4 nm, 4-10 nm, 4-8 nm, 4-7 nm, or 4-5 nm; and still more specifically, 3-10 nm, 3-8 nm, 4-10 nm, 4-8 nm, or 4-7 nm.

According to an embodiment of the present invention, the hydrophilic chemical functional groups exposed on the surface of the support particle in step (b) are originated from the support material per se. For example, in a case where $SiO_2$ nano-supports are manufactured, hydrophilic chemical functional groups (e.g., hydroxyl groups) originated from $SiO_2$ are exposed on the surface of each of the support particles. A cross-linker is not used when the $SiO_2$ nano-supports are manufactured.

According to an embodiment of the present invention, the hydrophilic chemical functional groups exposed on the surface of the support particle in step (b) are originated from the cross-linker. In embodiments in which the foregoing cross-linkers having hydrophilic chemical functional groups are used, the hydrophilic chemical functional groups exposed on the surface of the nano-support particle are originated from the cross-linkers.

Step (c): Partial Coating of T1 Contrast Material on Support Particle

A T1 contrast material is coated on the support particles to manufacture nanoparticles as T1 contrast agents. The coating of the T1 contrast material is achieved by bonding between the contrast material and the hydrophilic functional groups on the surface of the support particle; the coating of the T1 contrast material is a partial coating on the surface of the support; some of the hydrophilic functional groups on the support particle are still exposed on the surface of the support; and the hydrodynamic size of the nanoparticles is 2-30 nm.

The T1 contrast material used in the present invention includes various T1 contrast materials in the art.

The T1 contrast material used in the present invention is metal ion $M^{n+}$ (M is $Ti^{n+}$, $V^{n+}$, $Cr^{n+}$, $Mn^{n+}$, $Fe^{n+}$, $Co^{n+}$, $Ni^{n+}$, $Cu^{n+}$, $Ru^{n+}$ (0<n≤14), or a lanthanide metal), a metal oxide, a metal complex compound, a metal compound, or a multi-component hybrid structure thereof. Specific examples of the lanthanide metal used in the present invention include, but are not limited to, $Eu^{n+}$, $Gd^{n+}$, $Tb^{n+}$, $Dy^{n+}$, $Ho^{n+}$, $Er^{n+}$, $Tm^{n+}$, $Yb^{n+}$, and $Lu^{n+}$ (0<n≤14).

According to a more specific embodiment of the present invention, the T1 contrast material used in the present invention is metal oxide $M_xO_y$ (M is at least one metal element selected from the group consisting of $Ti^{n+}$, $V^{n+}$, $Cr^{n+}$, $Mn^{n+}$, $Fe^{n+}$, $Co^{n+}$, $Ni^{n+}$, $Cu^{n+}$, $Ru^{n+}$ (0<n≤14), and a lanthanide metal; and 0<x≤16, 0<y≤8). More specifically, the metal oxide is $M_xO_y$ (M=Mn or Fe, 0<x≤4, 0<y≤4).

The metal complex compound used as a T1 contrast material in the present invention refers to any material that is composed of a central metal and ligands capable of being coordinated on the metal, and especially, a complex compound composed of: a metal having an unpaired electron and thus exhibiting magnetism; and a coordination ligand. A specific example thereof is $M_xL_y$ (M is at least one element selected from the group consisting of $Ti^{n+}$, $V^{n+}$, $Cr^{n+}$, $Mn^{n+}$, $Fe^{n+}$, $Co^{n+}$, $Ni^{n+}$, $Cu^{n+}$, $Ru^{n+}$ (0<n≤14), and a lanthanide metal; L is at least one ligand capable of being coordinated on the metal; and 0<x≤10, 0<y≤120). The metal complex compound includes, more specifically, a metal chelate, a metal organic framework (MOF), or a coordination polymer.

The metal compound usable as the T1 contrast material includes a metal chalcogen (group 16 element) compound, a metal pnicogen (group 15 element) compound, a metal carbon group (group 14) compound, and a metal boron group (group 13) compound.

According to a specific embodiment of the present invention, examples of the metal chalcogen compound usable as a T1 contrast material in the present invention include $M^a_xA_z$, $M^a_xM^b_yA_z$ ($M^a$=at least one element selected from the group consisting of lanthanide elements (Ce, Pr, Nd, Pm, Sm, Gd, Eu, Tb, Dy, Ho, Er, Tm, Yb, and Lu) and transition metal elements (Ti, V, Cr, Mn, Fe, Co, Ni, Cu, and Ru); $M^b$=at least element selected from the group consisting of group 1 metal elements, group 2 metal elements, group 13-15 elements, group 17 elements, transition metal elements, lanthanide elements, and actinide elements; A is at least one selected from the group consisting of O, S, Se, Te, and Po; and 0<x≤16, 0≤y≤16, 0<z≤8), and a multi-component hybrid structure thereof, and most preferably, $M^a_xO_z$ and $M^a_xM^b_yO_z$ ($M^a$=at least one element selected from the group consisting of lanthanide elements (Ce, Pr, Nd, Pm, Sm, Gd, Eu, Tb, Dy, Ho, Er, Tm, Yb, and Lu), and transition metal elements (Ti, V, Cr, Mn, Fe, Co, Ni, Cu, and Ru); $M^b$=at least one element selected from the group consisting of group 1 metal elements, group 2 metal elements, group 13-15 elements, group 17 elements, transition metal elements, lanthanide elements, and actinide elements; and 0<x≤16, 0≤y≤16, 0<z≤8).

Specific examples of the metal pnicogen usable as a T1 contrast material include $M^c_xA_x$ and $M^c_xM^d_yA_z$ ($M^c$=at least one element selected from the group consisting of lanthanide elements (Ce, Pr, Nd, Pm, Sm, Gd, Eu, Tb, Dy, Ho, Er, Tm, Yb, and Lu) and transition metal elements (Ti, V, Cr, Mn, Fe, Co, Ni, Cu, and Ru); $M^d$=at least one element selected from the group consisting of group 1 metal elements, group 2 metal elements, group 13-14 elements, group 15 elements, group 17 elements, transition metal elements, lanthanide elements, and actinide elements; A is at least one selected from the group consisting of N, P, As, Sb, and Bi; and 0<x≤24, 0≤y≤24, 0<z≤8).

Specific examples of the metal carbon group compound usable as a T1 contrast material include $M^e_xA_z$ and $M^e_xM^f_yA_z$ ($M^e$=at least one element selected from the group consisting of lanthanide elements (Ce, Pr, Nd, Pm, Sm, Gd, Eu, Tb, Dy, Ho, Er, Tm, Yb, and Lu) and transition metal elements (Ti, V, Cr, Mn, Fe, Co, Ni, Cu, and Ru); $M^f$=at least one element selected from the group consisting of group 1 metal elements, group 2 metal elements, group 13-14 elements, group 15 elements, group 17 elements, transition metal elements, lanthanide elements, and actinide elements; A is at least one selected from the group consisting of C, Si, Ge, Sn, and Pb; and 0<x≤32, 0≤y≤32, 0<z≤8).

Specific examples of the metal boron group compound usable as a T1 contrast material include $M^i_xA_z$ and $M^i_xM^j_yA_Z$ ($M^i$=at least one element selected from the group consisting of lanthanide elements (Ce, Pr, Nd, Pm, Sm, Gd, Eu, Tb, Dy, Ho, Er, Tm, Yb, and Lu) and transition metal elements (Ti, V, Cr, Mn, Fe, Co, Ni, Cu, and Ru); $M^j$=at least one element selected from the group consisting of group 1 metal elements, group 2 metal elements, group 14-14 elements, group 15 elements, group 17 elements, transition metal elements, lanthanide elements, and actinide elements; A is at least one selected from the group consisting of B, Al, Ga, In, and TI; and 0<x4≤0, 0≤y≤40, 0<z≤8).

The metal chelate compound used in the present invention includes a central metal and a chelate ligand capable of binding to the central metal using both of two or more functional groups. Specific examples of the chelate ligand include, but are not limited to, ethylenediaminotetracetic acid (EDTA), diethylenetriaminopentaacetic acid (DTPA), N-[2-[bis(carboxymethyl)amino]-3-(4-ethoxyphenyl)propyl]-N-[2-[bis(carboxy methyl)amino]ethyl]-L-glycine (EOB-DTPA), N,N-bis[2-[bis(carboxymethyl) amino] ethyl]-L-glutamic acid (DTPA-GLU), N,N-bis[2-[bis(carboxy methyl)amino]ethyl]-L-lysine (DTPA-LYS), N,N-bis [2-[carboxymethyl [(methylcarbamoyl)methyl]amino]ethyl] glycine (DTPA-BMA), 4-carboxy-5,8,11-tris (carboxymethyl)-1-phenyl-2-oxa-5,8,11-triazatridecan-13-oic acid (BOPTA), 1,4,7,10-tetraazacyclododecan-1,4,7,10-tetraacetic acid (DOTA), 1,4,7,10-tetraazacyclododecan-1, 4,7-triacetic acid (DO3A), 10-(2-hydroxypropyl)-1,4,7,10-tetraazacyclododecan-1,4,7-triacetic acid (HPDO3A) 2-methyl-1,4,7,10-tetraazacyclododecane-1,4,7,10-tetraacetic acid (MCTA), (α,α',α'',α''')-tetramethyl-1,4,7,10-tetraazacyclododecan-1,4,7,10-tetraacetic acid (DOTMA), 3,6,9,15-tetraazabicyclo [9.3.1]pentadeca-1(15),11,13-triene-3,6,9-triacetic acid (PCTA), 4-carboxy-5,8,11-bis (carboxymethyl)-1-phenyl-12-(phenylmethoxy) methyl-8-phosphomethyl-2-oxa-5,8,11-triazatridecan-12-oid acid (BOPTA), N,N'-phosphonomethylimino-di-2,1-ethanediyl-bis(N-carboxymethyl glycine), N,N'-phosphonomethyl-imino-di-2,1-ethanediyl-bis(n-phosphonomethylglycine), N,N'-(phosphinomethylimino-di-2,1-ethanediyl-bis-(N-(carboxymethyl)glycine), 1,4,7,10-tetra azacyclodecane-1, 4,7,10-tetrakis(methylphosphonic acid)(DOTP), 1,4,7,10-tetraazacyclodecane-1,4,7,10-tetrakismethylene(methyl phosphinic acid) (DOTMP), or derivatives thereof.

At least one multi-component hybrid structure of metal ions, metal oxides, metal complex compounds, and metal compounds used in the present invention may be, as a specific example, a compound in which a complex compound ligand is further coordinated on the inorganic compound or a ligand is substituted with a component element of the inorganic compound, but is not limited thereto. A specific example of the hybrid structure is $M_2O(CO_3)_2 \cdot H_2O$ (M=$Ti^{n+}$, $V^{n+}$, $Cr^{n+}$, $Mn^{n+}$, $Fe^{n+}$, $Co^{n+}$, $Ni^{n+}$, $Cu^{n+}$, $Ru^{n+}$ (0<n≤14) or a lanthanide metal), which can be used as a T1 contrast agent of the present invention. The compound is a multi-component hybrid structure in a form in which two oxygen atoms of $M_2O_3$, one of the metal oxides, are substituted with $CO_3$ ligands. In addition, the multi-component hybrid structure usable as a T1 contrast medium is mixed with at least one of an ion, a metal, a metal oxide, a metal complex compound, and a metal compound, and thus may be present in various structures and shapes.

According to an embodiment of the present invention, the T1 contrast material used in the present invention is metal oxide $M_xO_y$ (M is at least one metal element selected from the group consisting of $Ti^{n+}$, $V^{n+}$, $Cr^{n+}$, $Mn^{n+}$, $Fe^{n+}$, $Co^{n+}$, $Ni^{n+}$, $Cu^{n+}$, $Ru^{n+}$ (0<n≤14), and a lanthanide metal; and 0<x≤16, 0<y≤8), more specifically, $M_xO_y$ (M=Mn or Fe, 0<x≤4, 0<y≤4), and still more specifically, an iron oxide, that is, $M_xO_y$ (M=Fe, 0<x≤4, 0<y≤4).

The coating of a contrast material on nano-supports each having hydrophilic chemical functional groups exposed on a surface thereof can be easily carried out. For example, as described in an example below, a contrast material can be coated on nano-supports by stirring with a suitable amount of T1 contrast material at a proper temperature (e.g., room temperature).

According to an embodiment of the present invention, the coating of a contrast material on nano-supports each having hydrophilic chemical functional groups exposed thereon is achieved through chemical bonding. The chemical bonding includes, for example, covalent bonding, coordination bonding, ionic bonding, hydrogen bonding, hydrophilic bonding, hydrophobic bonding, and Van Der Waals bonding. More specifically, the coating is achieved by chemical bonding, more specifically, covalent bonding, coordination bonding, ionic bonding, hydrogen bonding, hydrophilic bonding, hydrophobic bonding, and Van Der Waals bonding, of the contrast material and the hydrophilic chemical functional groups exposed on the surface of the nano-support.

One of the most important technical features of the present invention is that a contrast material, especially, a T1 contrast material is partially coated on the surface of the support.

As used herein, the term "partial coating" means that the contrast material is not coated throughout the entire surface of the support but only on a part of the surface of the support. Specifically, the term "partial coating" means that the contrast material is not coated on the entirety of the hydrophilic functional groups exposed on the support, but coated on only a part thereof.

According to an embodiment of the present invention, the constant material is bound to 14-70%, 14-60%, 14-50%, 14-45%, 15-70%, 15-60%, 15-50%, 15-45%, 16-70%, 16-60%, 16-50%, or 16-45% of the hydrophilic functional groups on the surface of the support particle. The constant material is bound to, more specifically, 15-45% or 16-45%, and still more specifically 15-25%, 16-25%, 15-20%, or 16-20% of the hydrophilic functional groups on the surface of the support particle. If the proportion of the hydrophilic functional groups on the surface of the support particle coated with a contrast material is out of the above-described numerical range, the stability and contrast ability of the finally manufactured nano-contrast agents may be significantly reduced (see examples).

According to an embodiment of the present invention, in the contrast agents of the present invention coated with a contrast material, the functional groups still exposed on the surface are 30-86%, 40-86%, 50-86%, 55-86%, 30-85%, 40-85%, 50-85%, 55-85%, 30-84%, 40-84%, 50-84%, or 55-84% on the basis of the overall functional groups exposed on the surface at the initial stage. More specifically, in the contrast agent of the present invention coated with a contrast material, the functional groups still exposed on the surface are 55-85% or 55-84%, and more specifically, 75-85%, 75-84%, 80-85%, or 80-84%.

It is very interesting technical achievement that a contrast material is partially coated on a surface of a nano-support to still expose hydrophilic functional groups on the surface of the nano-support, thereby improving both stability and contrast ability of the finally manufactured nano-contrast agent as described above.

The partial coating with a contrast material can be achieved by adjusting the amount of contrast material used. According to an embodiment of the present invention, the amount of contrast material relative to 100 weight of the support particles in step (c) is 0.5-10 wt %, 0.8-7.0 wt %, 0.5-5.0 wt %, or 0.9-5.0 wt %. More specifically, the amount of contrast material relative to 100 weight of the support particles in step (c) is 0.6-10 wt %, 0.6-8.0 wt %, 0.6-7.0 wt %, 0.6-6.0 wt %, 0.6-5.0 wt %, 0.7-10 wt %, 0.7-8.0 wt %, 0.7-7.0 wt %, 0.7-6.0 wt %, 0.7-5.0 wt %, 0.8-10 wt %, 0.8-8.0 wt %, 0.8-7.0 wt %, 0.8-6.0 wt %, 0.8-5.0 wt %, 0.9-10 wt %, 0.9-8.0 wt %, 0.9-7.0 wt %, 0.9-6.0 wt %, or 0.9-5.0 wt %, and still more specifically, 0.9-10 wt %, 0.9-8.0 wt %, 0.9-7.0 wt %, 0.9-6.0 wt %, or 0.9-5.0 wt %.

According to an embodiment of the present invention, when amine groups are exposed on the surface of the nano-support by using a cross-linker having amine groups, step (b) or (c) further includes a step for substituting the amine groups with carboxyl groups. More specifically, after the contrast material is coated in step (c), the amine groups still exposed on the surface are substituted with another type of hydrophilic functional groups, carboxylic groups. Such a substitution with carboxyl groups allows the contrast agents of the present invention to minimize, especially, human body toxicity, in a more druggable form.

The hydrodynamic size of the nanoparticles as contrast agents manufactured by the present invention is 2-30 nm, specifically, 2-25 nm, 2-20 nm, 2-15 nm, 2-10 nm, 2-8 nm, 2-6 nm, 2-5 nm, 3-25 nm, 3-20 nm, 3-15 nm, 3-10 nm, 3-8 nm, 3-6 nm, 3-5 nm, 4-25 nm, 4-20 nm, 4-15 nm, 4-10 nm, 4-8 nm, 4-7 nm, or 4-6 nm; more specifically 3-25 nm, 3-20 nm, 3-15 nm, 3-10 nm, 3-8 nm, 3-6 nm, 3-5 nm, 4-25 nm, 4-20 nm, 4-15 nm, 4-10 nm, 4-8 nm, 4-7 nm, or 4-6 nm; and still more specifically, 3-10 nm, 3-8 nm, 3-6 nm, 3-5 nm, 4-10 nm, 4-8 nm, 4-7 nm, or 4-6 nm.

The T1 nano-contrast agents that are finally manufactured by the present invention exhibit significantly improved characteristics in both stability and contrast ability.

According to an embodiment of the present invention, the nanoparticles as T1 contrasts of the present invention showed dispersion stability in which a hydrodynamic size change is ±10% or less for a NaCl concentration change between 125 mM to 500 mM in an aqueous solution, ±10% or less for a change between pH 6 and pH 8, and ±10% or less a temperature range between 4° C. and 37° C.

According to an embodiment of the present invention, the nanoparticles as contrast agents of the present invention show a T1 relaxivity of 2.7-5.0 $s^{-1}$ for a concentration of 1 mM (metal basis). Such T1 relaxivity indicates very excellent contrast ability compared with a previously developed T1 contrast agent.

In accordance with another aspect of the present invention, there are provided T1 contrast agent nanoparticles including: (a) support particles; and (b) a T1 contrast material coated on the support particles, wherein hydrophilic functional groups are exposed on a surface of each of the support particles; the hydrodynamic size of the support particles is 1-20 nm; the T1 contrast material is bound to the hydrophilic functional groups on the surface of the support particle, and the T1 contrast material is bound to some of the hydrophilic functional groups on the surface of the support; some of the hydrophilic functional groups on the support particle are still exposed on the surface of the support; and the hydrodynamic size of the nanoparticles is 2-30 nm.

According to an embodiment of the present invention, the support material is an organic polymer, silica, or gold (Au) each containing hydrophilic chemical functional groups.

According to an embodiment of the present invention, the organic polymer is a polysaccharide.

According to an embodiment of the present invention, the polysaccharide is dextran.

According to an embodiment of the present invention, the T1 contrast material is coated on the support through chemical bonding.

According to an embodiment of the present invention, the hydrodynamic size of the support particles is 1-15 nm, 1-10 nm, 1-8 nm, 1-5 nm, 1-4 nm, 2-15 nm, 2-10 nm, 2-8 nm, 2-5 nm, 2-4 nm, 3-15 nm, 3-10 nm, 3-8 nm, 3-5 nm, 3-4 nm, 4-15 nm, 4-10 nm, 4-8 nm, 4-7 nm, or 4-5 nm.

According to an embodiment of the present invention, the hydrodynamic size of the nanoparticles as a T1 contrast agent is 2-25 nm, 2-20 nm, 2-15 nm, 2-10 nm, 2-8 nm, 2-6 nm, 2-5 nm, 3-25 nm, 3-20 nm, 3-15 nm, 3-10 nm, 3-8 nm, 3-6 nm, 3-5 nm, 4-25 nm, 4-20 nm, 4-15 nm, 4-10 nm, 4-8 nm, 4-7 nm, or 4-6 nm.

According to an embodiment of the present invention, the organic polymer is cross-linked by a cross-linker having hydrophilic chemical functional groups.

According to an embodiment of the present invention, the hydrophilic chemical functional groups exposed on the surface of the support particle in step (b) are originated from the support material per se.

According to an embodiment of the present invention, the hydrophilic chemical functional groups exposed on the surface of the support particle are originated from the cross-linker.

According to an embodiment of the present invention, the cross-linker having hydrophilic chemical functional groups is a cross-linker having amine groups.

According to an embodiment of the present invention, amine group are exposed on the surface of the support particle and the exposed amine groups are substituted with carboxylic groups.

According to an embodiment of the present invention, the T1 contrast material is an iron oxide.

According to an embodiment of the present invention, the T1 contrast material is bound to 14-70%, 14-60%, 14-50%, 14-45%, 15-70%, 15-60%, 15-50%, 15-45%, 16-70%, 16-60%, 16-50%, or 16-45% of the hydrophilic functional groups on the surface of the support particle.

According to an embodiment of the present invention, the nanoparticles as T1 contrasts of the present invention showed dispersion stability in which a hydrodynamic size change is ±10 or less for a NaCl concentration change between 125 mM to 500 mM in an aqueous solution, ±10 or less for a change between pH 6 and pH 8, and ±10 or less a temperature range between 4° C. and 37° C.

According to an embodiment of the present invention, the nanoparticles as contrast agents of the present invention show a T1 relaxivity of 2.7-5.0 $s^{-1}$ for a concentration of 1 mM (metal basis).

Advantageous Effects

Features and advantages of the present invention are summarized as follows.

(a) The present invention is directed to an improvement of existing contrast agents, especially, T1 contrast agents, and adopts a strategy in which a T1 contrast material is partially coated on a surface of a support with hydrophilic functional groups exposed thereon.

(b) According to a specific embodiment, the T1 contrast material binds to the hydrophilic functional groups on the surface of the support, a relative proportion of hydrophilic functional groups is still exposed even after the coating, and such a feature makes a great contribution to the effects attained by the present invention.

(c) It is very interesting that both of stability and contrast ability of the nanoparticles as T1 contrast agents are improved by a partial coating strategy adopted by the present invention, and no known art discloses such a strategy.

DETAILED DESCRIPTION

Hereinafter, the present invention will be described in detail with reference to examples. These examples are only for illustrating the present invention more specifically, and it will be apparent to those skilled in the art that the scope of the present invention is not limited by these examples.

EXAMPLES

Example 1: Synthesis of Dextran Nano-Supports and Partial Coating of $T_1$ Contrast Material Dextran nano-supports were synthesized through cross-linking of dextran (molecular weight: 10 kDa, Pharmacosmos, Denmark). Specifically, 1.8 g of dextran was dissolved in a basic aqueous solution, and then epichlorohydrin (6 mL, Sigma, USA) and ethylenediamine (26 mL, Sigma, USA) as cross-linkers were added thereto, followed by 24 hr-reaction in a thermostatic bath at room temperature. The reaction product was purified using a hollow fiber membrane filter (MWCO 10,000, GE Healthcare, Netherlands). The synthesized dextran nano-supports showed a dynamic diameter of about 4.1 nm. $FeCl_2$, $FeCl_3$, and NaOH were respectively added at a molar ratio of 1:2:8 to the synthesized dextran nano-supports, followed by strong magnetic stirring for 30 minutes at room temperature, thereby introducing $Fe_3O_4$ as a $T_1$ contrast material. The synthesized nanoparticles were purified using a hollow fiber membrane filter (MWCO 10,000, GE Healthcare, Netherlands).

Example 2: Control of Proportion of $T_1$ Contrast Material Bound to Dextran Nano-Support In the $T_1$ contrast material introduction step in example 1 above, the proportion of the $T_1$ contrast material bound to the dextran nano-support was controlled by adjusting the amount (Fe metal basis) of $T_1$ contrast material ($FeCl_2$ or $FeCl_3$) to 0.1% (wt), 1% (wt), 2.5% (wt), 5.0% (wt), 10.0% (wt), 25% (wt), 50% (wt), and 100% (wt) when the weight of the overall dextran nano-supports is 100. The hydrodynamic size of the synthesized nanoparticle contrast agents was measured as about 4.7 nm, 4.8 nm, 5.8 nm, 6.5 nm, 7.2 nm, 9.0 nm, 10.0 nm, and 25 nm, respectively, as the amount of the $T_1$ contrast material increased. The quantification of $T_1$ contrast material bound to the dextran nano-supports conducted using inductively coupled plasma mass spectrometry (ICP-MS, PerkinElmer, USA). Specifically, a piranha solution (mixture solution of 1:3 $H_2O_2$ and $H_2SO_4$) was added to each material, and the mixture was heated at 70° C. for 24 hours and then diluted with distilled water to reach a volume of 10 mL. As a result of analysis, the amounts (Fe metal basis) of the contrast material bound relative to 100 weight of the support particles showed 0.1% (wt), 0.99% (wt), 2.44% (wt), 4.76% (wt), 9.09% (wt), 20.0% (wt), 33.3% (wt), and 50.0% (wt), respectively.

Example 3: Quantification of Hydrophilic Functional Groups on Surface of Nano-Support Since amine ($-NH_2$) functional groups were introduced to a surface of each of the nano-supports manufactured in example 1 above, the quantification of hydrophilic functional groups on the surface of each of the nano-supports was conducted using TNBSA assay, which is a well-known amine quantification method. Specifically, an aqueous solution of 0.01% (w/v) 2,4,6-trinitrobenzene sulfonic acid (TNBSA, Thermo, USA) was added to 0.5 mL of 10 mg/mL nano-supports, followed by reaction at 37° C. for 2 hours, and then 0.25 mL of an aqueous solution of 10% sodium dodecyl sulfate (SDS, Sigma, USA) and 0.125 mL of 1 M HCl (Sigma, USA) were added thereto, and the absorbance was measured at a wavelength of 339 nm. Here, to quantify the amount of amine groups from the absorbance, a total of five different concentrations of lysine (Sigma, USA) solutions were subjected to TNBSA assay and the absorbance was measured to plot a calibration curve.

Example 4: Quantification of Proportion of Contrast Material-Bound Functional Groups Relative to Overall Functional Groups on Surface of Nano-Support The quantification of the proportion was conducted by measuring the amount of amine groups of contrast agent-introduced nano-supports and the amount of amine groups of pure nano-supports and then comparing the amounts. Here, the amount of nano-supports was the same, and was calculated as a percentage by the following equation.

{(amine groups of pure nanosupports amine groups of constant material-introduced nanosupports)/ (amine groups of pure nanosupports)}×100

Figure 1:
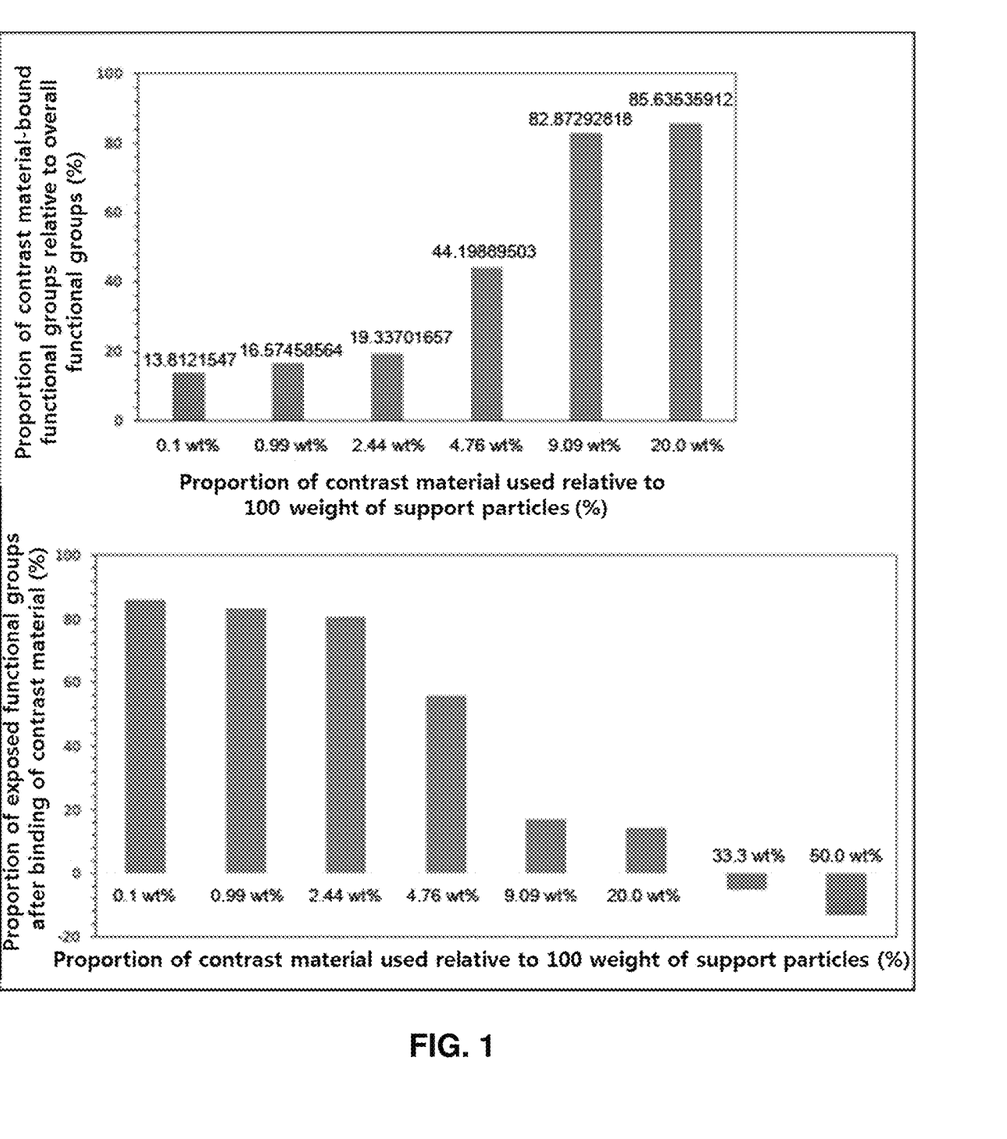
FIG. 1 shows, relative to the overall hydrophilic functional groups (amine groups) on a surface of a nano-support manufactured by the present invention, the proportion of contrast material-bound functional groups (upper graph) and the proportion of still exposed contrast material-bound functional groups (lower graph).

As the amount of $T_1$ contrast material bound relative to 100 wt of the dextran supports increased to 0.1% (wt), 0.99% (wt), 2.44% (wt), 4.76% (wt), 9.09% (wt), and 20.0% (wt), the proportion of contrast material-bound functional groups in the overall functional groups on the surface of the nano-support increased to 13.81%, 16.57%, 19.34%, 44.20%, 82.87%, and 85.64%. That is, after the contrast material was bound, the proportion of functional groups exposed on the surface of the nano-support was 86.19%, 83.43%, 80.66%, 55.80%, 17.13%, and 14.36% for 0.1% (wt), 0.99% (wt), 2.44% (wt), 4.76% (wt), 9.09% (wt), and 20.0% (wt) in the amount of $T_1$ contrast material bound, respectively. No exposed functional groups were detected when the amount of $T_1$ contrast material bound was 33.3% (wt) and 50.0% (wt) (FIG. 1).

Example 5: Test on Stability of Nano-Contrast Agents

The dextran nano-contrast agents were tested for stability in various salt conditions, pH conditions, and temperature conditions including physiological environments. An aqueous solution of 2 M NaCl (Sigma, USA) was properly added to the same amount of nano-contrast agents to prepare salt conditions of 500 mM, 250 mM, and 125 mM, respectively. For pH conditions, the same amount of nano-contrast agents were incubated in buffer solutions of 0.1 M NaCl with pH 6, 7, and 8. For temperature conditions, the same amount of nano-contrast agents were incubated in PBS solutions with pH 7.4 at 37° C. and 4° C.

Example 6: Measurement of Stability of Nano-Contrast Agents

The stability of the dextran nano-contrast agents were measured through a change rate in hydrodynamic size of the nano-contrast agents. The change rate of the hydrodynamic size at each condition, implemented in example 7, relative to the hydrodynamic size in the pH 7.4 PBS solution at room temperature was calculated as a percentage. All the hydrodynamic sizes were measured using a zeta potential system (NanoZS Zetasizer, Malvern, UK).

Figure 2:
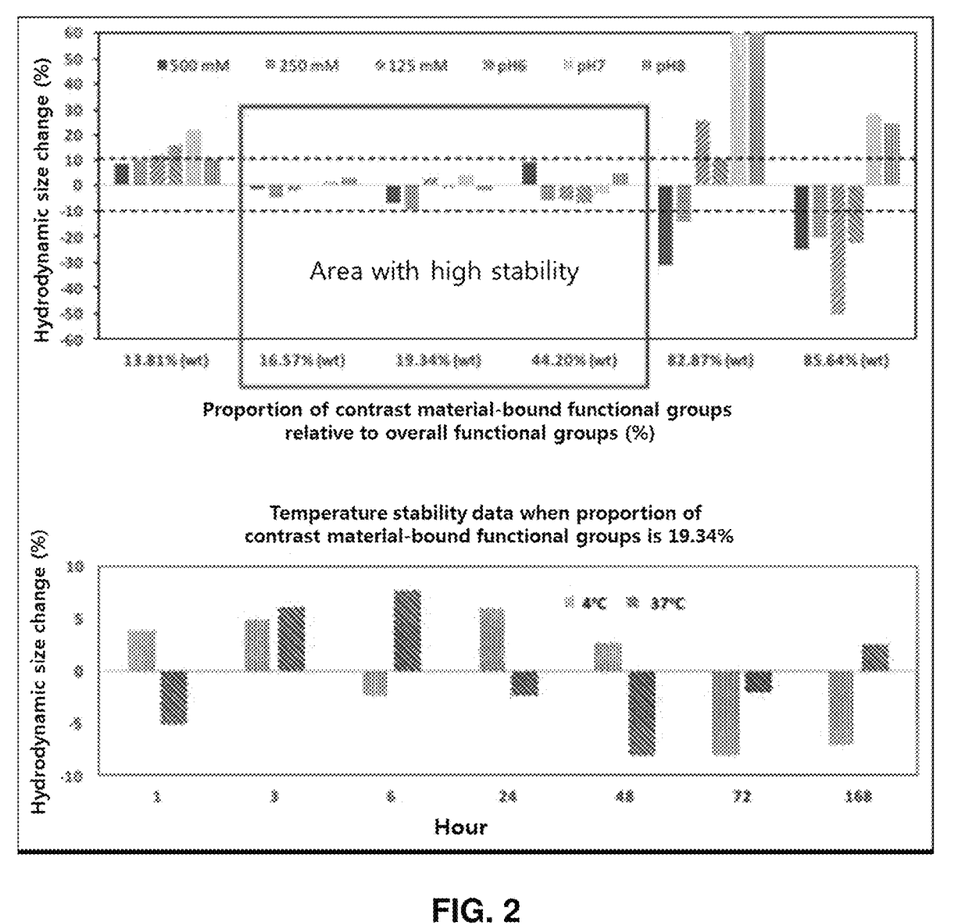
FIG. 2 shows the results of analyzing stability of nano-contrast agents of the present invention.
Figure 3:
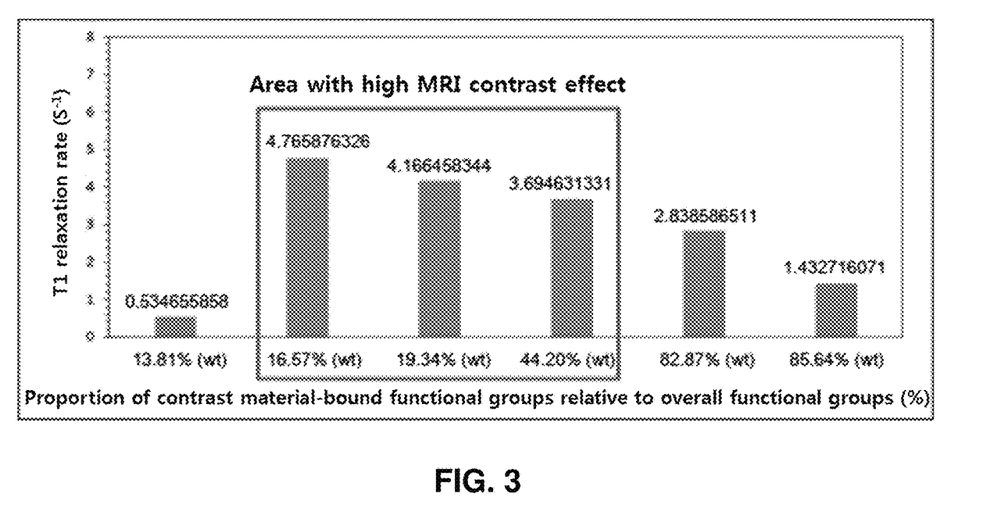
FIG. 3 shows the results of analyzing T1 relaxivity rate of the present invention.

The stability of the support varied according to the amount of T1 contrast material bound (i.e., the proportion of exposed functional groups) relative to 100 wt of the dextran supports. Specifically, when the proportion of contrast agent-bound functional groups relative to the overall functional groups is 16.57% (exposure proportion: 83.43%), 19.34% (exposure proportion: 80.66%), and 44.20% (exposure proportion: 55.80%), the change rate in hydrodynamic size was less than 10% in the salt conditions and pH conditions. Whereas, for 13.81% (exposure proportion: 86.19%), 82.87% (exposure proportion: 17.13%), and 85.64% (exposure proportion: 14.36%), significantly high change rates of hydrodynamic size was shown, indicating instability. As a result of observation for 168 hours at temperature conditions of 37° C. and 4° C. when the proportion of functional groups was 19.34% (exposure proportion: 80.66%), the change rate of hydrodynamic size was less than 10%, and thus high stability was maintained (FIG. 2).

Example 7: Measurement of MRI Contrast Effect of Nano-Contrast Agent $T_1$-MRI contrast effect ($T_1$ relaxivity) of the dextran nano-contrast agents was measured using the 3 Tesla MRI equipment (Philips Achieva). A specific experiment method was as follows. Each sample was dispersed in water at a concentration of 1 mM (iron basis), placed in PCR tube, and fixed on a supporting member. The supporting member was placed in the center of an MRI animal coil (Custume made, China), and $T_1$ relaxation time was measured using the following inverse recovery MRI sequence. [TI=100, 500, 1000, 2000, and 3000 ms, time of echo (TE)=7.4 ms, FOV=100 mm, matrix=256×256, slice thickness=2 mm, and acquisition number=1].

As a result of testing, when the proportion of contrast agent-bound functional groups relative to the overall functional groups was 16.57%, 19.34%, 44.20%, and 82.87%, $T_1$ relaxivity (the inverse of $T_1$ relaxation time, $R_1$), which is a barometer of $T_1$ contrast effect, was 4.77 s$^{-1}$, 4.17 s$^{-1}$, 3.69 s$^{-1}$, and 2.83 s$^{-1}$, respectively, which were at least 2 times to at most 9 times higher compared with 13.81% ($R_1$=0.53 s$^{-1}$) and 85.64% ($R_1$=1.43 s$^{-1}$).

Example 8: Substitution of Functional Group with Carboxyl Group on Surface of Nano-Contrast Agent The dextran nano-contrast agent containing amine groups (nano-contrast agent having 2.44 wt % of $T_1$ contrast material), manufactured in the example above, was reacted with a succinic anhydride (100 molar excess compared with amine groups existing on a surface of a nano-support, Acros, USA) in dimethyl sulfoxide (DMSO, Daejung Chemical, Korea) at room temperature for 12 hours under magnetic stirring. Thereafter, the reaction produce was diluted with distilled water such that the proportion of DMSO in the entire solution was less than 5%, and purified using a centrifugal membrane filter (MWCO 10,000, UltraCone, Millipore, USA).

Example 9: Test of Animal Toxicity of Nano-Contrast Agent

ICR mice (6 weeks old, 8 female/male each in a total of 16 animals) were intravenously administered with dextran nano-contrast agents (a nano-contrast agent containing amine groups and a nano-contrast agent having substituted carboxyl groups, both having 2.44 wt % of a T1 contrast material).

Figure 4:
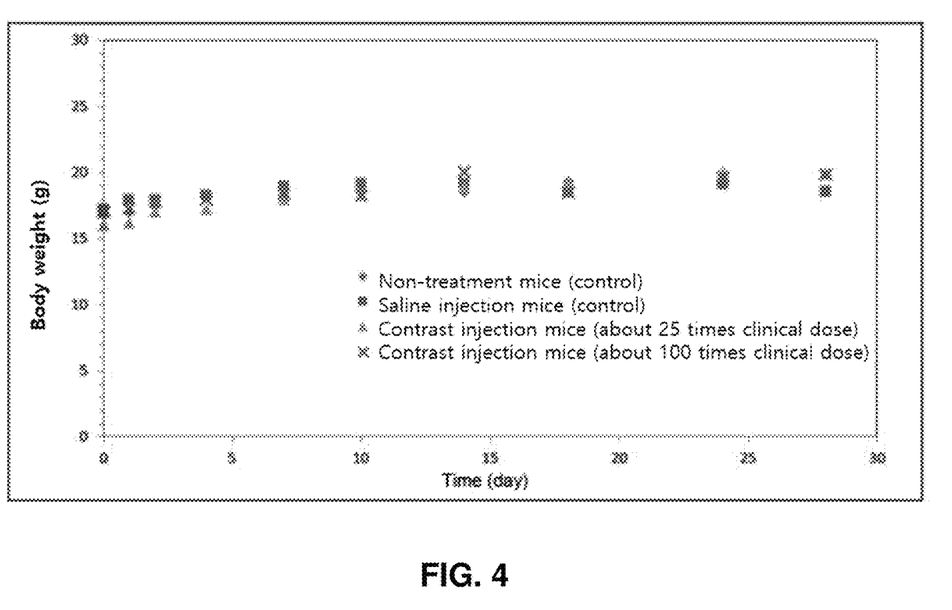
FIG. 4 shows the results of analyzing animal toxicity of nano-contrast agents of the present invention.

The mice were divided into four groups, each of which had 2 female/male each (a non-injection group, a saline injection group, a high-dose group, and a medium-dose group). The total dose was 25 mL/kg, and was divided into two times each 12.5 mL/kg. The dose of each individual was calculated based on the weight of the day of administration. Tail veins of test systems were intravenously administered at a rate of about 2 mL/min at intervals of 12 hours using a disposable syringe (1 mL, 26 G). For toxicity evaluation, general conditions (type of toxic symptom, timing of onset, recovery period, etc.) and death or not were observed and weight measurement was conducted after the administration. First, as a result of injection of the dextran nano-contrast agent containing amine groups on the surface thereof, all mice were dead regardless of the dose of injection. When the nano-contrast agent with substituted carboxyl groups was injected, no death cases were observed in not only the medium-dose group but also the high-dose group, and the mouse weight change over time was increased equally in the dose groups and the control groups, indicating no toxicity (FIG. 4).

Example 10: Synthesis of Protein Nano-Supports and Partial Coating of $T_1$ Contrast Material Dextran nano-supports were synthesized through cross-linking of bovine serum albumin (BSA, Sigma, USA). Specifically, 12.6 mg of BSA was dissolved in a solution of 50 mM NaCl (Sigma, USA), and then ethylene diamine (26 μL, Sigma, USA) as a cross-linker, 1-ethyl-3-(3-dimethyl-aminopropyl)carbodiimide hydrochloride (EDC, 9.58 mg, Thermofisher, USA), and sulfo-NHS (1.08 mg, Thermofisher, USA) were added, followed by reaction at room temperature for 2 hours. The reaction product was purified using a centrifugation membrane filter (MWCO 10,000, UltraCone, Millipore, USA). The synthesized protein nano-supports showed a dynamic diameter of about 6.1 nm. $FeCl_2$, $FeCl_3$, and NaOH were respectively added at a molar ratio of 1:2:8 to the synthesized protein nano-supports, followed by strong magnetic stirring for 30 minutes at room temperature, thereby introducing $Fe_3O_4$ as a $T_1$ contrast material. The synthesized nanoparticles were purified using a centrifugation membrane filter (MWCO 10,000, UltraCone, Millipore, USA). The finally obtained protein nano-contrast agents showed a hydrodynamic size of about 7.7 nm.

Example 11: Synthesis of Gold Nano-Supports and Partial Coating of $T_1$ Contrast Material Gold nanoparticles were synthesized by reducing chloroauric acid ($HAuCl_4$, Sigma, USA) in the presence of tetrakis(hydroxymethyl)phosphoniumchloride (THPC, Sigma, USA). Specifically, 4 μL of THPC was dissolved in a basic aqueous solution, followed by magnetic stirring for a sufficiently long time. 29.4 mM $HAuCl_4$ (0.6 mL) was added thereto, followed by again magnetic stirring for about 10 minutes. The synthesized gold nanoparticles were purified using a centrifugation membrane filter (MWCO 10,000, UltraCone, Millipore, USA). The synthesized gold nano-supports showed a dynamic diameter of about 7.8 nm. The purified gold nanoparticles were stirred together with an excessive amount of cystamine (Sigma, USA) at room temperature for 12 hours, to thereby introduce amine ($-NH_2$) functional groups to surfaces of the nanoparticles. $FeCl_2$, $FeCl_3$, and NaOH were respectively added at a molar ratio of 1:2:8 to the synthesized gold nanoparticles, followed by strong magnetic stirring for 30 minutes at room temperature, thereby introducing $Fe_3O_4$ as a $T_1$ contrast material. The synthesized gold nanoparticles were purified using a centrifugation membrane filter (MWCO 10,000, UltraCone, Millipore, USA). The finally obtained gold nano-contrast agents showed a hydrodynamic size of about 22 nm.

Example 12: Stability of Protein Nano-Supports and Gold Nanoparticle Supports

Figure 5:
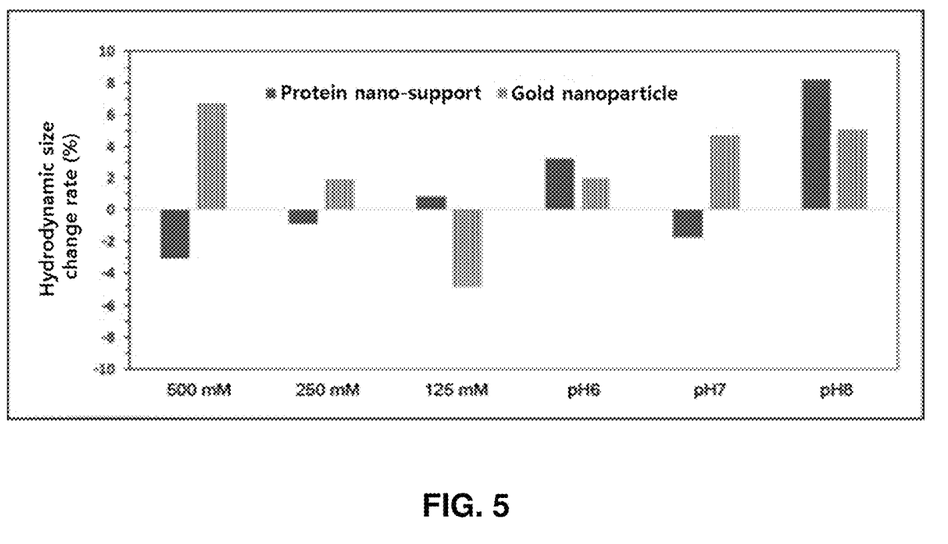
FIG. 5 shows the results of analyzing the stability of nano-support particles of the present invention manufactured by using a protein or gold as a support.

In the protein support synthesized in example 10 and the gold nanoparticle support synthesized in example 11, the proportion for contrast material-bound functional groups in the overall functional groups was 19.38% and 30.08% for the cases, respectively, and these contrast agents showed a hydrodynamic size change of less than 10%, indicating high stability (FIG. 5). The proportion values of contrast material-bound functional groups are within a range in which the above-described dextran nano-supports showed high stability.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A method of preparing a druggable T1 contrast agent, the method comprising:
    (a) cross-linking dextran using epichlorohydrin and an amine cross-linking agent to provide a support particle, comprising hydrophilic chemical functional groups exposed on its surface, wherein
        (i) the hydrophilic chemical functional groups comprise amine groups; and
        (ii) the hydrodynamic size of the support particle is from 1-8 nm;
    (b) coordinating a T1 contrast material comprising $Fe^{2+}$, $Fe^{3+}$, or combination thereof on 20% or fewer of hydrophilic functional groups on the surface of the support particle to provide a particlized T1 contrast agent, wherein the hydrodynamic size of the particlized contrast agent is 2-6 nm; and
    (c) substituting the amine groups with carboxyl groups to provide the druggable T1 contrast agent;
    wherein the druggable T1 contrast agent of step (c) has reduced toxicity when intravenously administered relative to the particlized T1 contrast agent of step (b).

2. The method of claim 1, wherein the hydrodynamic size of the support particles is from 1-5 nm, 1-4 nm, 2-8 nm, 2-5 nm, 2-4 nm, 3-8 nm, 3-5 nm, 3-4 nm, 4-8 nm, 4-7 nm, or 4-5 nm.

3. The method of claim 1, wherein the hydrodynamic size of the particlized contrast agent is 2-5 nm, 3-6 nm, 3-5 nm, or 4-6 nm.

4. The method of claim 1, wherein the T1 contrast material is an iron oxide.

5. The method of claim 1, wherein in step b, the amount of the T1 contrast material used relative to the weight of the support particles is from 0.5-10 wt %, 0.8-7.0 wt % 0.5-5.0 wt %, or 0.9-5.0 wt %.

6. The method of claim 1, wherein the particlized T1 contrast agent showed dispersion stability in which the hydrodynamic size change is ±10% or less when exposed to (i) a NaCl concentration change between 125 mM to 500 mM in an aqueous solution at constant pH and room temperature; (ii) a ±10% or less for a change between pH 6 and pH 8 in an aqueous solution of 0.1M NaCl at room temperature; and (iii) ±10% or less for a temperature range between 4° C. and 37° C. in phosphate buffered saline at pH 7.4.

7. The method of claim 1, wherein the $T_1$ contrast material is a metal.

8. The method of claim 7, wherein the particlized contrast agent exhibits a $T_1$ relaxivity of 2.7-5.0 s−1 for 1 mM concentration of iron in a field strength of 3T.

9. The method of claim 8, wherein the $T_1$ contrast material is an iron oxide.

10. The method of claim 9, wherein the $T_1$ contrast material is $Fe_3O_4$.

11. The method of claim 4, wherein the $T_1$ contrast material is $Fe_3O_4$.

12. The method of claim 1, wherein the druggable T1 contrast agent exhibits reduced toxicity in the body relative to a reference T1 contrast agent.

\* \* \* \* \*